(12) United States Patent
Allen et al.

(10) Patent No.: US 8,944,722 B1
(45) Date of Patent: Feb. 3, 2015

(54) SPRING SYSTEMS FOR VORTEX SUPPRESSION DEVICES

(71) Applicant: VIV Solutions LLC, Richmond, TX (US)

(72) Inventors: Donald Wayne Allen, Richmond, TX (US); William Andrew West, Friendswood, TX (US); Jeffrey Robert Dupuis, Houston, TX (US); Julie Ann Dehne, Cypress, TX (US)

(73) Assignee: VIV Solutions, LLC, Richmond, TX (US)

( * ) Notice: Subject to any disclaimer, the term of this patent is extended or adjusted under 35 U.S.C. 154(b) by 0 days.

(21) Appl. No.: 13/829,478

(22) Filed: Mar. 14, 2013

Related U.S. Application Data

(60) Provisional application No. 61/711,987, filed on Oct. 10, 2012.

(51) Int. Cl.
  F15D 1/10 (2006.01)
  E02B 17/00 (2006.01)
  F16L 1/12 (2006.01)

(52) U.S. Cl.
  CPC .......... *E02B 17/0017* (2013.01); *F16L 1/123* (2013.01)
  USPC ........................................... 405/216

(58) Field of Classification Search
  USPC .................... 405/211–216; 114/243
  See application file for complete search history.

(56) References Cited

U.S. PATENT DOCUMENTS

| | | | | |
|---|---|---|---|---|
| 5,018,471 | A * | 5/1991 | Stevens ......................... | 405/211 |
| 7,458,752 | B2 * | 12/2008 | Esselbrugge et al. ......... | 405/216 |
| 7,845,299 | B2 * | 12/2010 | Masters et al. ................ | 114/243 |
| 2008/0050181 | A1 | 2/2008 | Masters et al. | |

* cited by examiner

*Primary Examiner* — Sunil Singh
(74) *Attorney, Agent, or Firm* — Blakely Sokoloff Taylor & Zafman LLP

(57) ABSTRACT

A vortex-induced vibration (VIV) suppression system configured to accommodate a change in an underlying tubular diameter. The system including an encircling member dimensioned to at least partially encircle an underlying tubular. The encircling member may be, for example, a collar or a VIV suppression device such as a strake, or any other type of VIV suppression device. The system further including a band member dimensioned to encircle the encircling member and hold the encircling member around the underlying tubular at a desired axial position. A spring member may further be provided. The spring member may be positioned between the encircling member and the band member and dimensioned to contract in response to an increase in a diameter of the underlying tubular and expand in response to a decrease in a diameter of the underlying tubular such that the encircling member remains at the desired axial position.

10 Claims, 10 Drawing Sheets

SPRING SYSTEMS FOR VORTEX SUPPRESSION DEVICES

CROSS-REFERENCE TO RELATED APPLICATION

The application claims the benefit of the earlier filing date of U.S. Provisional Patent Application No. 61/711,987, filed Oct. 10, 2012 and incorporated herein by reference.

BACKGROUND OF THE INVENTION

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections.

Two solutions for VIV suppression are helical strakes and fairings. Typically, helical strakes are made by installing fins helically around a cylindrical shell. The cylindrical shell may be separated into two halves and positioned around the tubular to helically arrange the fins around the underlying tubular. While helical strakes, if properly designed, can reduce the VIV fatigue damage rate of a tubular in an ocean current, they typically produce an increase in the drag on the tubular and hence an increase in deflection. Thus, helical strakes can be effective for solving the vibration problem at the expense of worsening the drag and deflection problem.

Another solution is to use fairings as the VIV suppression device. Typical fairings have a substantially triangular shape and work by streamlining the current flow past the tubular. A properly designed fairing can reduce both the VIV and the drag. Fairings are usually made to be free to weathervane around the tubular with changes in the ocean current.

A challenge associated with both helical strakes and fairings is their use on tubulars that have an outside diameter that shrinks due to hydrostatic pressure. This is often true of risers that have insulation or buoyancy on the outside of an inner metallic tubular. Since it is usually much cheaper to install helical strakes or fairings on a tubular while it is above the water surface (before it is lowered), this means that the tubular diameter will often be larger at the surface than at depth. Helical strakes that are banded onto the tubular risk coming loose when the diameter shrinks since the bands are typically not sufficiently compliant to accommodate the diameter change. Fairings utilize thrust collars that restrain the fairings from sliding down the tubular. These thrust collars are often banded on and suffer from the same lack of compliance that helical strakes experience.

SUMMARY OF THE INVENTION

In accordance with an embodiment of the invention, a device for supporting a vortex-induced vibration (VIV) suppression device is disclosed. The device may include a collar member having a web portion dimensioned to encircle an underlying tubular and flanges extending from opposing sides of the web portion in a direction opposite the underlying tubular. A band member may be provided which encircles the web portion and the underlying tubular so as to hold the collar member about the tubular. A resilient member may be positioned between the collar member and the web portion. The resilient member may be dimensioned to expand or contract in response to a change in diameter of the underlying tubular so that an axial alignment of the collar member about the underlying tubular can be maintained.

In accordance with another embodiment of the invention, a system for reducing vortex induced vibration (VIV) about a tubular is disclosed. The system may include a strake section having a shell portion dimensioned to encircle an underlying tubular and a fin extending from the shell portion. A slot may be formed through the fin portion and a band member dimensioned for insertion through the slot and around the shell portion may be provided. The system may further include a resilient member positioned within the slot portion, the resilient member dimensioned to expand or contract in response to a change in diameter of the underlying tubular so that an axial alignment of the strake section about the underlying tubular is maintained.

In accordance with another embodiment of the invention, a vortex-induced vibration (VIV) suppression system configured to accommodate a change in an underlying tubular diameter is disclosed. The system may include an encircling member dimensioned to at least partially encircle an underlying tubular. The encircling member may be, for example, a collar or a VIV suppression device such as a strake, or any other type of VIV suppression device. The system may further include a band member dimensioned to encircle the encircling member and hold the encircling member around the underlying tubular at a desired axial position. A spring member may further be provided. The spring member may be positioned between the encircling member and the band member and dimensioned to contract in response to an increase in a diameter of the underlying tubular and expand in response to a decrease in a diameter of the underlying tubular such that the encircling member remains at the desired axial position.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION OF THE INVENTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

The present invention is directed to a spring system that allows a band, or other structure, used to position a VIV suppression device about a tubular to accommodate changes in the tubular outside diameter so that a position of the VIV suppression device can be maintained. In some embodiments, the spring system is a discrete spring system made up of more than one spring member that can be positioned about the band. It has been found that, in some embodiments, a discrete spring system is preferable over a system that runs most of the length of the band (e.g., a resilient liner) because such a unitary system may not be able to accommodate a significant amount of tubular shrinkage since the band pressure is low relative to the material stiffness of most practical liner materials. Even if such a spring system is hollow, it is difficult to obtain sufficient deformation of the liner so that it acts like a spring with low creep or compression set.

Figure 1A:
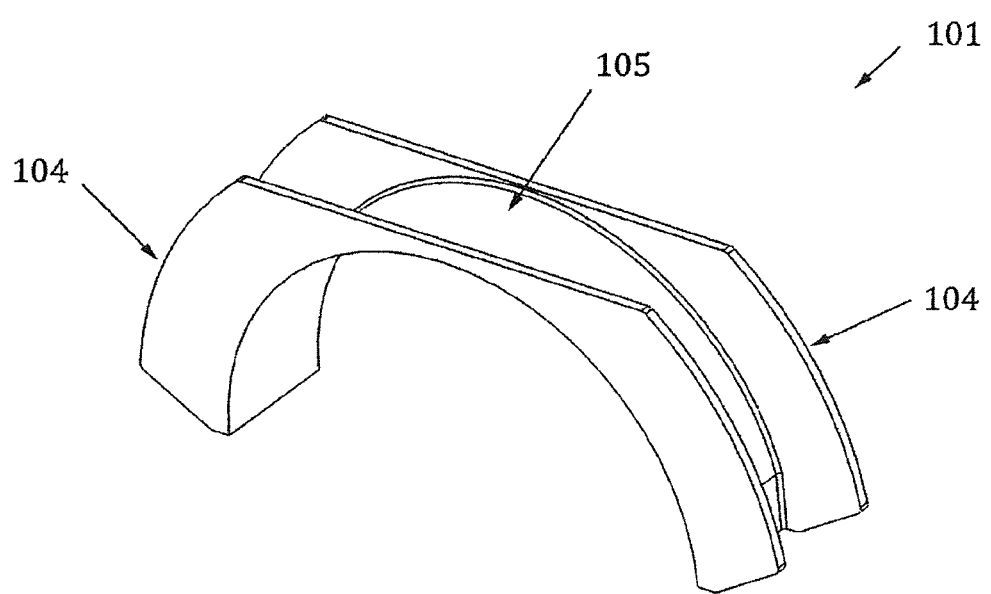
FIG. 1A is a perspective view of one embodiment of a collar half.

Referring now to the invention in more detail, FIG. 1A is a perspective view of one embodiment of a collar half. Collar half 101 may be half of a collar used to axially align a VIV suppression device about a tubular. Collar half 101 may include a web 105 and two flanges 104. Web 105 may be used as a surface to band the collar against a tubular or other structure. In this aspect, web 105 may be, for example, a band shaped member have dimensions which conform to a curvature of an underlying tubular or other structure. Flanges 104 may extend from opposing sides of web 105 in a substantially perpendicular direction (away from an underlying tubular) such that they can be used to restrict adjacent structures, such as VIV suppression devices, from sliding past collar half 101. Collar half 101 may be made of any suitable material including, but not limited to, thermoplastics, elastomers, metals, and composite or hybrid materials. Although a single collar half 101 is illustrated in FIG. 1A, it is to be understood that a complete collar includes a second collar half which is substantially identical to collar half 101 such that when the two are used together, they encircle an entire circumference of the underlying tubular.

Figure 1B:
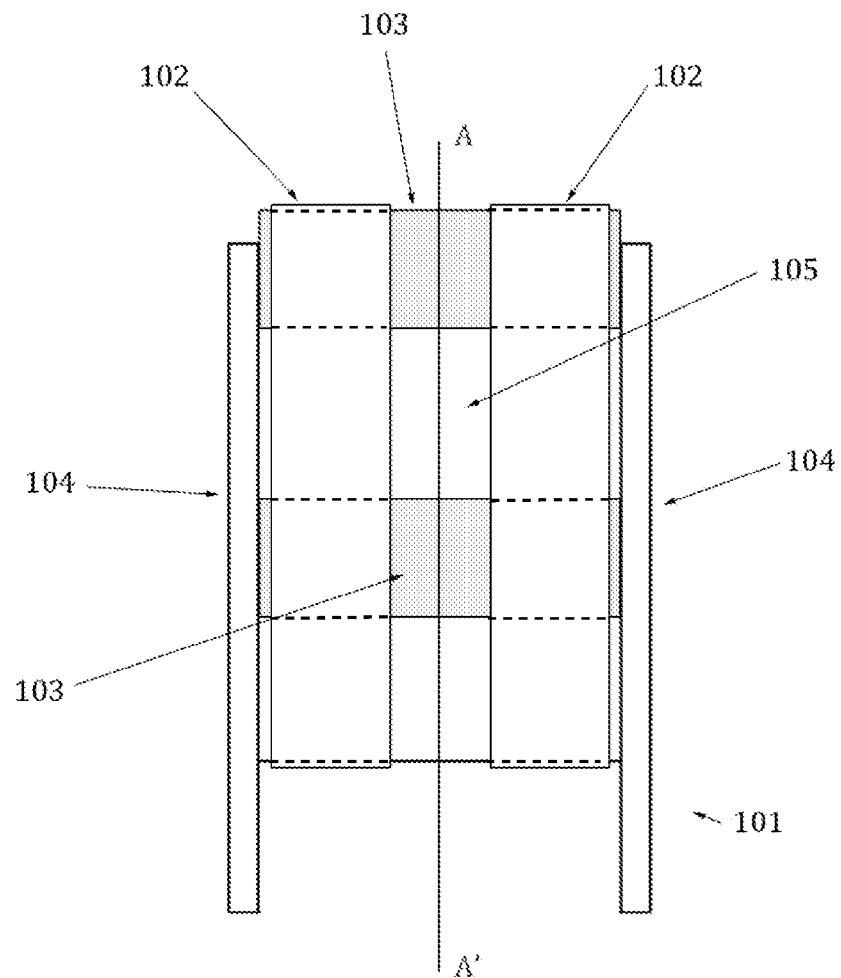
FIG. 1B is an end view of one embodiment of a collar half with springs.

FIG. 1B illustrates an end view of a collar half such as that illustrated in FIG. 1A. Representatively, collar half 101 is again shown having a web 105 and two flanges 104. Springs 103 are shown positioned in a widthwise direction across web 105. Springs 103 are shown positioned directly on top of web 105 such that when bands 102 are wrapped around web 105, springs 103 are between web 105 and bands 102. In this aspect, when bands 102 are tightened, they apply pressure to springs 103 which, in turn, causes springs 103 to deform. Springs 103 apply pressure to web 105, which can then apply pressure to an underlying structure (e.g., a tubular).

Still referring to FIG. 1B, web 105 will typically range from ½ inch wide to 12 inches wide, but most typically will range from 1 inch wide to 6 inches wide. A single band 102 may be used, or multiple bands 102 may be used. The bands 102 will typically range in width from ½ inch to 2 inches.

Springs 103 may have a finite width and may, or may not, cover the entire distance between the two flanges 104 (i.e., a width of web 105). Springs 103 may be of any suitable size, but the total of all of the springs 103 will typically cover no more than ½ of the total circumference of collar half 101. Springs 103 may be any type of resilient structure, for example, a hollow structure, a solid structure or made of a solid material. Springs 103 may also consist of other types of compression springs such as a coiled spring. Springs 103 may be attached to web 105 using any suitable attachment mechanism (e.g., screws, bolts, brackets, adhesives, or the like) or may be positioned on web 105 and held in place by flanges 104 and bands 102. Still further, in some embodiments, springs 103 may be molded to web 105 and/or one or both of flanges 104 by any suitable molding technique.

Still referring to FIG. 1B, collar half 101 and springs 103 may be made of any suitable material, including thermoplastics, elastomers, metals, and composite of hybrid materials. For example, springs 103 may be made of stripes of an elastomeric material.

Figure 1C:
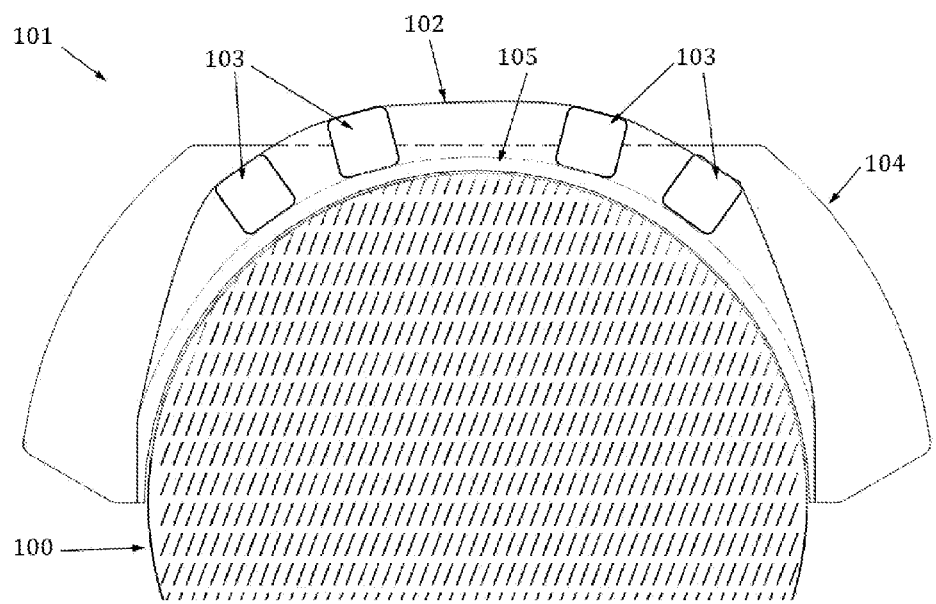
FIG. 1C is a cross sectional view of the collar half of b along line A-A'.

Referring to FIG. 1C, FIG. 1C illustrates a cross-sectional side view of the collar half of FIG. 1B along line A-A' and positioned around an underlying structure. In particular, collar half 101 is shown positioned around tubular 100. Collar half 101 includes web 105 and flange 104 extending therefrom. From this view, it can be seen that springs 103 are positioned against web 104 and band 102 lies on top of springs 103. Note that it is also possible for band 102 to go through one or more springs 103. In this way, the springs may be pre-installed onto the bands.

Again referring to FIG. 1C, band 102 has a substantially fixed length such that once it is secured around collar half 101 and the underlying tubular 101, band 102 has a substantially fixed circumference. Thus, when band 102 is put into tension (such as by an expansion of tubular 101), it applies pressure to springs 103 which causes springs 103 to compress to accommodate the diameter change. Similarly, when a tension on band 102 is reduced (such as by a contracting tubular diameter), springs 103 expand to fill in the gap created between band 102 and the reduced tubular diameter so that collar half 101 is still held tightly around tubular 100.

It is noted that by having discrete springs instead of a continuous spring or liner, the local pressure on springs 103 is higher (for a given band tension) and thus the compression of springs 103 is greater. This allows collar half 101 and band 102 to accommodate a greater change in the diameter of tubular 100 than a continuous spring or liner would allow.

Still referring to FIG. 1C, web 105 may be, for example, ⅛ of an inch thick to 1 inch thick but may be of any suitable thickness. Flanges 104 may be of any suitable height. Springs 103 will be of the height and width required to accommodate the required change in diameter of tubular 100, for example from about ¼ inch to 2 inches tall.

Figure 1D:
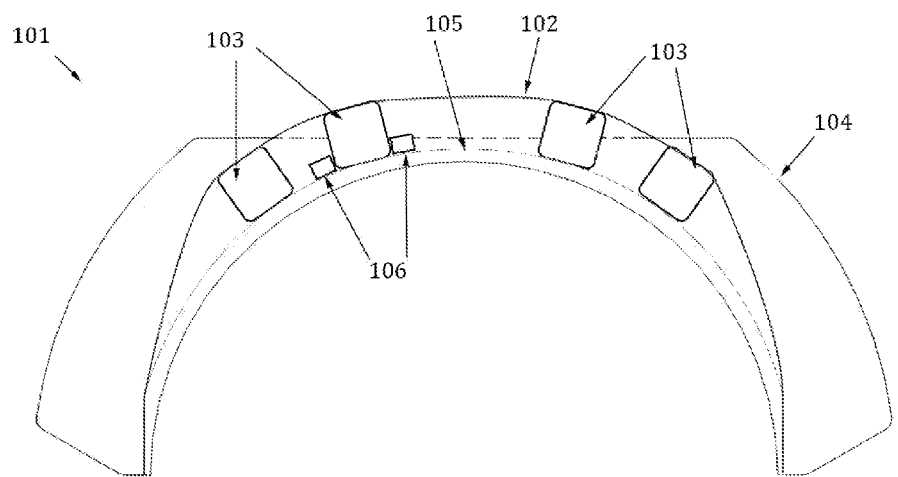
FIG. 1D is a cross sectional view of the collar half of FIG. 1B along line A-A'.

FIG. 1D illustrates a cross-sectional side view of the collar half of FIG. 1B along line A-A', which is substantially similar to the collar half of FIG. 1C except in this embodiment, guides are included to help holds springs in a desired position. From this view, it can be seen that collar half 101 may be substantially similar to the previously discussed collar half in that it includes web 105 and flanges 104. Springs 103 can be positioned against web 105 and band 102 lies on top of springs 103 as previously discussed. A tubular (not shown) lies underneath collar half 101. Optional guides 106 are adjacent to one of the springs 103 to keep the spring from sliding relative to web 105. Guides 106 may help to prevent springs 103 from sliding along web 105.

For example, in one embodiment, guides 106 may be provided on one or more sides of spring 103 to provide resistance against sliding of springs 103. Guides 106 may be made of a single member or multiple structural members and may be of any size and shape suitable for preventing sliding of springs 103. For example, guides 106 may be "U" shaped brackets which extend between flanges 104 and along part of the span of springs 103. Alternatively, guides 106 may be placed on top of springs 103. Or guides may be placed on, or under, or around band 102. In some embodiments, guides 106 may be fastened to collar half 101 by either fastening to web 105 or to flanges 104 by any suitable mechanism (e.g., bolts, screws, bands, brackets, adhesive or the like). In still further embodiments, guides 106 may also be fastened directly to springs 103 or to band 102.

Guides 106 may be of any size and shape suitable for preventing sliding of springs 103 around web 105. Representatively, in one embodiment, guides 106 may be fastener such as a bolt or screw. Guides 106 may be used to hold up any suitable spring shape. For example, guides 106 may be used to hold a helical compression spring in place. Although two guides 106 are illustrated, it is contemplated that any number of guides 106 may be used. For example, all of the springs 103 may have guides 106, none of the springs 103 may have guides 106, or one or more of the springs 103 may have guides 106. Guides 106 may also be considered housings dimensioned to house an associated spring.

Figure 1E:
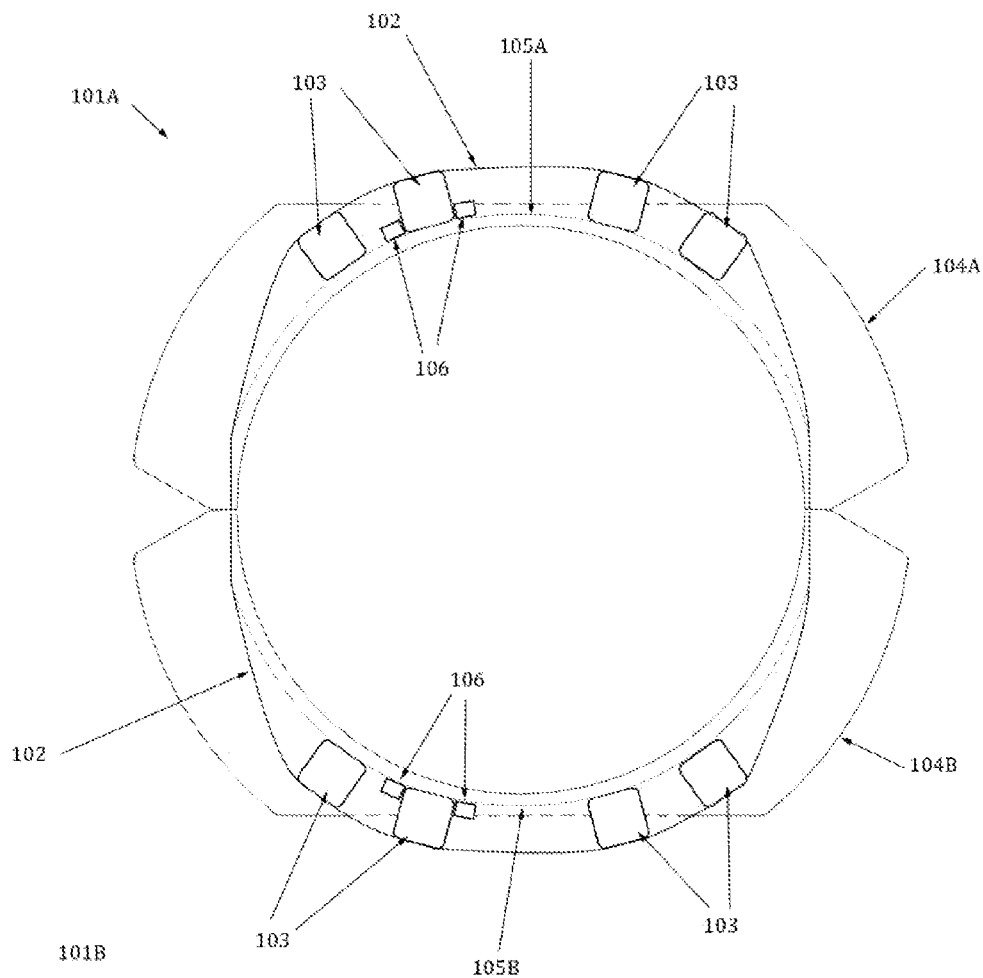
FIG. 1E illustrates the collar half of FIG. 1D coupled to a second collar half.

FIG. 1E illustrates the collar half of FIG. 1D coupled to a second collar half. Representatively, it can be seen from this view that collar halves 101A and 101B are held onto a tubular by band 102. Collar halves 101A and 102B have webs 105A and 105B as well as flanges 104A and 104B, respectively. Springs 103 reside under band 102 and optional guides 106 restrain one or more springs 103 from sliding or overturning.

Again referring to FIG. 1E, this figure illustrates that either one or two collar halves may be used. Also, collars whose sum of all of their segments does not cover the full circumference may be used, and any number of segments may be used to make up the collar. Any number of springs 103 may also be used and any number of these springs 103 may, or may not, have one or more guides 106. Collar halves 101A and 101B may be secured together around the tubular by band 102, or/or by other securing mechanisms (e.g., a hinge).

Figure 1F:
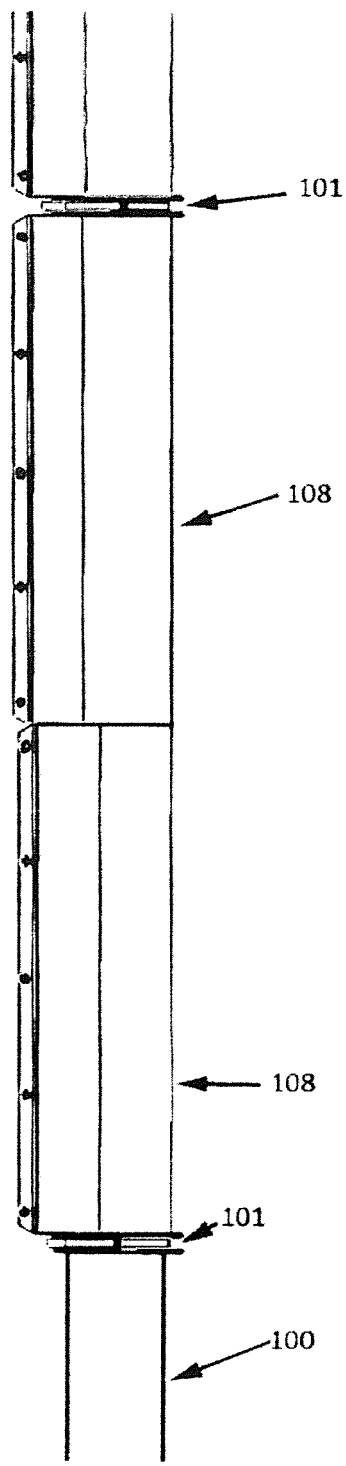
FIG. 1F illustrates a side view of one embodiment of a plurality of suppression devices supported along a tubular.

FIG. 1F illustrates a side view of suppression devices held in place along an underlying structure by any one or more of the previously discussed collar halves. In particular, as can be seen from this view, collar halves 101 are positioned between ends of suppression devices 108 such that they prevent suppression devices 108 from sliding axially along the underlying structure 100 (e.g., a tubular). In one embodiment, suppression devices 108 may be fairings free to weathervane around the tubular 100 while collar halves 101 are clamped around the underlying the tubular.

FIG. 1F illustrates an embodiment in which each of collar halves 101 support two suppression devices 108. It is contemplated, however, that collar halves 101 can support any number of suppression devices 108 ranging from 1 to 100, for example where suppression devices 108 are fairings, each of collar halves 101 can support between 1 and 8 fairings. Collar halves 101 may also support other suppression devices such as helical strakes, Henning devices, splitter plate type devices, smooth sleeves, perforated structures, or any other device that requires support on a tubular.

Figure 2A:
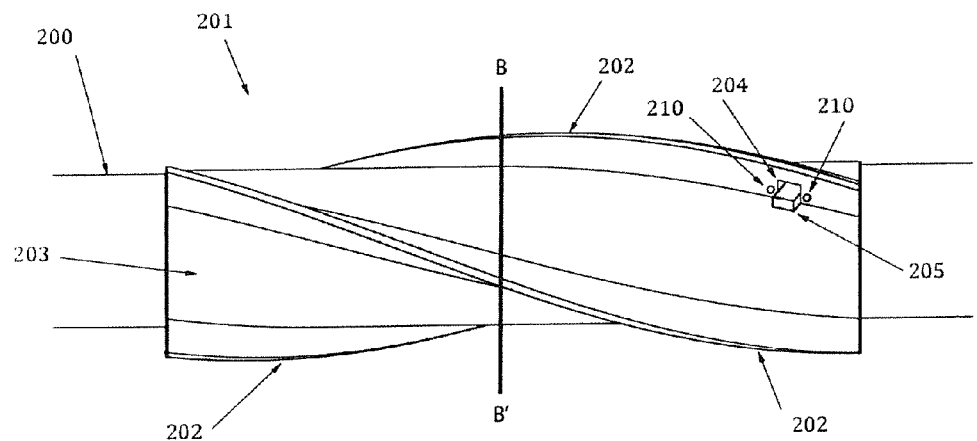
FIG. 2A is a side view of one embodiment of a helical strake on a tubular with a spring.

FIG. 2A illustrates a side perspective view of one embodiment of a suppression device positioned around an underlying structure. Representatively, FIG. 2A shows helical strake section 201 positioned around tubular 200. Strake section 201 may have three fins 202 that are attached to, or part of, shell 203. A slot 204 may be formed through one or more of fins 202. A spring 205 for accommodating a tubular diameter change, such as any of those previously discussed, may be positioned within slot 204. Optional fasteners 210 may assist in keeping spring 205 in place, either directly or by restraining an internal structure.

Helical strake section 201 may be a single piece or may consist of two or more sections around the circumference. Any number of fins 202 and/or slots 204 and/or springs 205 may be present. Each fin may or may not have one or more slots, and each slot may or may not have one or more springs. In this aspect, when a band (not shown) is placed around helical strake section 201, through slot 204 and on top of spring 205, spring 205 compresses as the band tightens. If a diameter of tubular 200 shrinks or otherwise changes, the spring allows the band to maintain tension even though the diameter changes. Bands may be placed on top of spring 205 or may go through spring 205. Also, the band may reside in a channel, such as a channel to produce a gap or stand-off between the main strake body from the underlying tubular.

Spring 205 may be of any suitable shape but will typically fit into part of slot 204 and/or fins 202. Spring 205 may be of any suitable height, and of any suitable cross section or even spring type. The helical shape of the fins 202 may sufficiently keep springs 205 in place. Optional fasteners 210 for keeping spring 205 in place my further be provided. Fasteners 210 may be any type of fastener of any size suitable for retaining spring 205 within slot 204. For example, fasteners 210 may be bolts, screws, brackets, adhesives or the like. Helical strake section 201, including fins 202, shell 203, and spring 205, may be made of any suitable material such as those previously discussed.

Figure 2B:
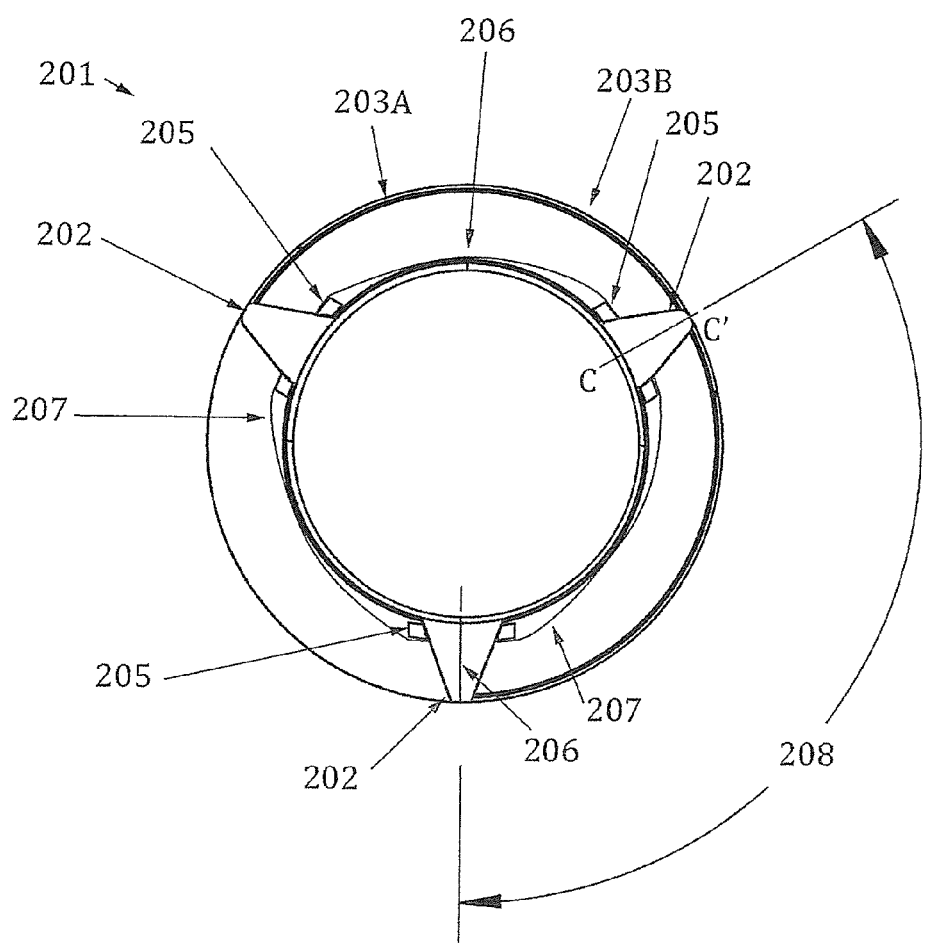
FIG. 2B is a cross sectional end view of the helical strake of FIG. 2A along line B-B'.

FIG. 2B illustrates a cross-sectional view of the helical strake section of FIG. 2A along line B-B'. FIG. 2B shows helical strake section 201 having shell halves 203A and 203B which are banded together using band 207. Shell halves 203A and 203B meet at a gap 206, which may in some embodiments, extend along a length of fin 202. Helical strake section 201 has fins 202 that are attached to shell half 203A or shell half 203B. Springs 205 are shown positioned through slots within each of the fins 202. In this aspect, when band 207 is put into tension, it compresses springs 205 and puts pressure onto shell halves 203A and 203B which, in turn put pressure on an inner tubular (not shown). Gap 206 may get smaller as the band tension is increased.

Springs 205 may be of any suitable size, shape, material, or type such as those previously discussed, provided they are able to compress when band 207 is tightened. Springs 205 will typically each cover less than 20% of the helical strake section 201 circumference. The total of springs 205, for a give point along the length of strake section 201, will cover less than 50% of the circumference of strake section 201.

Figure 2C:
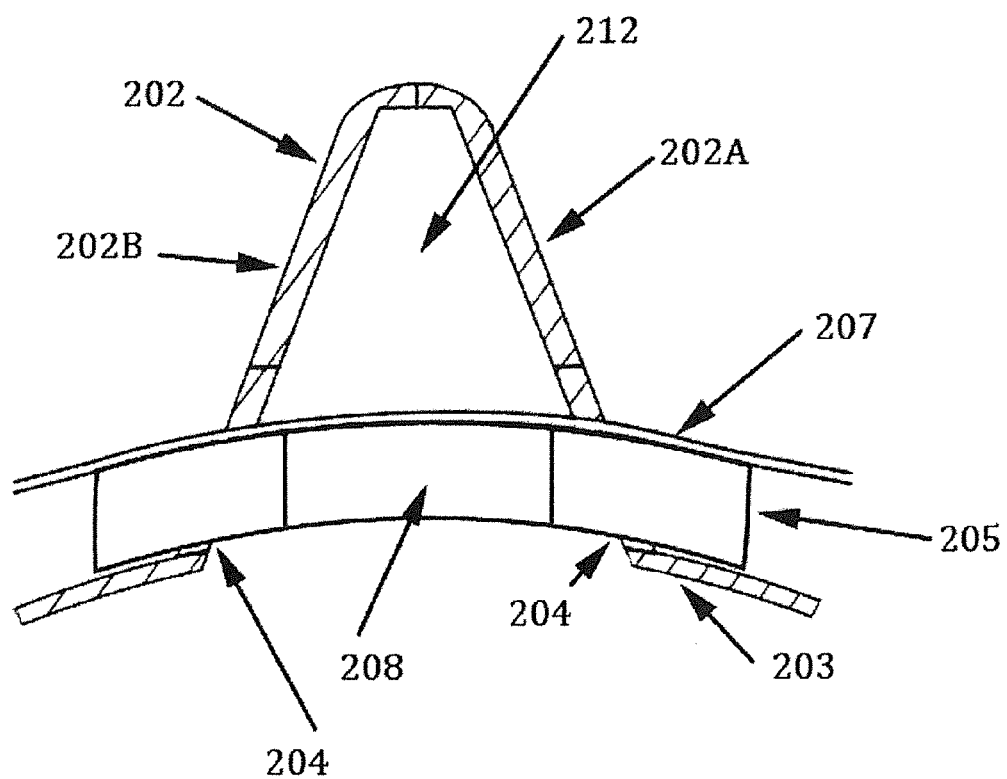
FIG. 2C is a cross sectional view of the helical strake of FIG. 2B along line C-C'.

FIG. 2C illustrates a cross-sectional view of the helical strake section of FIG. 2B along line C-C'. From this view, it can be seen that fin 202 includes a first portion 202A and a second portion 202B which extend from shell 203 such that a hollow channel 212 is formed within fin 202. In this aspect, slot 204 is formed through both of the first portion 202A and second portion 202B such that spring 205 and band 207 go through both sides of fin 202. Band 207 is positioned on top of spring 205. In some embodiments, spring 205 may include a middle portion 208 which rests within hollow channel 212 and is dimensioned to keep the spring from slipping out through the slot. For example, middle portion 208 may extend out of the plane such that it is wider than slot 204, and in some cases, is wider than opposing ends of spring 205. In this aspect, when the tension of band 207 is increased, spring 205 compresses onto shell 203. Spring section 208, which is part of spring 205, will in turn partially compress.

Figure 2D:
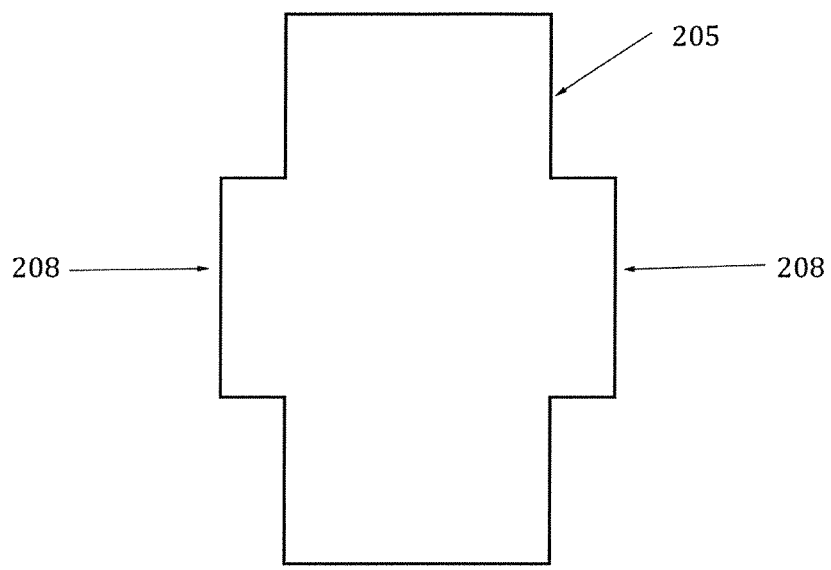
FIG. 2D is a top view of one embodiment of a spring.

FIG. 2D illustrates a top view of the spring of FIG. 2C. From this view, it can be seen that spring 205 includes middle portion 208 which is wider than the rest of spring 205 and wider than the slot within which spring 205 is inserted. With middle portion 208, spring 205 is intentionally and significantly wider than a slot that spring 205 would be inserted into. In this fashion, middle portion 208 assist in keeping spring 205 in place and from sliding through the slot and out of the slot.

Although a spring having a wider middle portion 208 is shown, it is contemplated that in other embodiments, fasteners or other appurtenances may be used in place of middle portion 208. Middle portion 208 may be made of any suitable size, shape and material. Middle portion 208 may be part of spring 205 or middle portion 208 may be separate pieces that are bonded or attached to spring 205.

In the foregoing specification, the invention has been described with reference to specific embodiments thereof. It will, however, be evident that various modifications and changes can be made thereto without departing from the broader spirit and scope of the invention as set forth in the appended claims. For example, while discrete springs for a collar and for a helical strake are shown, the spring system disclosed herein may be used for other structures that may be attached to a tubular such as Henning devices or measurement clamps. The discrete springs may also be used for a banded or bolted device (e.g. collar, or helical strake) by placing them between the device and the tubular. The springs may be put underneath the device so that the springs are located between the device and the tubular. The specification and drawings are, accordingly, to be regarded in an illustrative rather than a restrictive sense.

What is claimed is

1. A system for reducing vortex induced vibration (VIV) about a tubular, the system comprising:
    a strake section having a shell portion dimensioned to encircle an underlying tubular and a fin extending from the shell portion;
    a slot formed through the fin portion;
    a band member dimensioned for insertion through the slot and around the shell portion; and
    a resilient member positioned around the shell portion, the resilient member having discrete sections that are spaced apart and dimensioned to expand or contract in response to a change in diameter of the underlying tubular so that an axial alignment of the strake section about the underlying tubular is maintained, each of the discrete sections being positioned at an opening formed through the shell portion such that a portion of each of the discrete sections is exposed through the shell portion to an underlying tubular.

2. The system of claim 1 wherein the resilient member is positioned between the band member and the shell portion, and at least one of the discrete sections is positioned collinear with the fin portion.

3. The system of claim 1 wherein the fin portion comprises a first portion and a second portion and the opening is formed through a section of the shell portion between the first portion and the second portion.

4. The system of claim 3 wherein the slot is formed through the first portion and the second portion of the fin, and the resilient member comprises end portions and a middle portion, wherein the ends portions extend through the slot formed in the first portion and the second portion and the middle portion is aligned with the opening.

5. The system of claim 1 wherein each of the discrete sections is dimensioned to encircle less than 20% of the circumference of the strake section.

6. The system of claim 1 wherein for a given point along a length of the strake section, the discrete sections combined, encircle less than 50% of the circumference of the strake section.

7. A vortex-induced vibration (VIV) suppression system configured to accommodate a change in an underlying tubular diameter, the system comprising:
    an encircling member dimensioned to at least partially encircle an underlying tubular;
    a band member dimensioned to encircle the encircling member and hold the encircling member around the underlying tubular at a desired axial position; and
    a spring member positioned between the encircling member and the band member, wherein the spring member comprises spaced apart sections that are dimensioned to encircle less than half of a full circumference of the encircling member and to contract in response to an increase in a diameter of the underlying tubular and expand in response to a decrease in a diameter of the underlying tubular such that the encircling member remains at the desired axial position.

8. The system of claim 7 wherein the encircling member is a collar configured to be positioned at an end of a VIV suppression device.

9. The system of claim 7 wherein the encircling member is a shell portion of a helical strake.

10. The system of claim 7 wherein the spring member is positioned within the encircling member.

* * * * *